(12) United States Patent
Lulker et al.

(10) Patent No.: US 9,945,351 B2
(45) Date of Patent: Apr. 17, 2018

(54) DEVICE FOR HANDLING A WIND TURBINE ROTOR BLADE

(71) Applicant: Wobben Properties GmbH, Aurich (DE)

(72) Inventors: Frank Lulker, Aurich (DE); Albrecht Brenner, Aurich (DE)

(73) Assignee: Wobben Properties GmbH, Aurich (DE)

( * ) Notice: Subject to any disclaimer, the term of this patent is extended or adjusted under 35 U.S.C. 154(b) by 455 days.

(21) Appl. No.: 14/412,943

(22) PCT Filed: Jun. 5, 2013

(86) PCT No.: PCT/EP2013/061566
§ 371 (c)(1),
(2) Date: Jan. 5, 2015

(87) PCT Pub. No.: WO2014/005781
PCT Pub. Date: Jan. 9, 2014

(65) Prior Publication Data
US 2015/0192104 A1    Jul. 9, 2015

(30) Foreign Application Priority Data
Jul. 6, 2012  (DE) .................. 10 2012 211 877

(51) Int. Cl.
*F03D 1/00* (2006.01)
*F03D 13/40* (2016.01)

(52) U.S. Cl.
CPC ............. *F03D 1/005* (2013.01); *F03D 13/40* (2016.05); *Y02B 10/30* (2013.01); *Y02E 10/72* (2013.01); *Y02P 70/523* (2015.11)

(58) Field of Classification Search
CPC .......... F03D 11/00; F03D 11/04; F03D 13/40; F03D 80/50
See application file for complete search history.

(56) References Cited

U.S. PATENT DOCUMENTS

| | | | |
|---|---|---|---|
| 1,996,695 A | 4/1935 | Bigley, Jr. | |
| 2,335,692 A | 11/1943 | Murray | |
| 2,725,241 A | 11/1955 | Leonard, Jr. | |
| 2,740,331 A * | 4/1956 | Schwartz ................. | B23D 3/04 188/166 |

(Continued)

FOREIGN PATENT DOCUMENTS

| | | |
|---|---|---|
| DE | 32 15 880 A1 | 12/1982 |
| DE | 199 38 017 A1 | 3/2001 |

(Continued)

*Primary Examiner* — Joseph J Hail
*Assistant Examiner* — Tyrone V Hall, Jr.
(74) *Attorney, Agent, or Firm* — Seed Intellectual Property Law Group LLP (57) ABSTRACT

There is provided an apparatus for rotating and/or displacing a rotor blade of a wind power installation. The apparatus has at least one main body for at least partially embracing the rotor blade with a longitudinal, at least one contact portion for bearing against the rotor blade and at least one main frame for receiving the main body for rotation of the main body about the longitudinal axis and/or for displacement of the main body. The main body has at least one pivotably mounted pivotal portion for engagement at at least one side of the rotor blade.

8 Claims, 12 Drawing Sheets

(56) References Cited

U.S. PATENT DOCUMENTS

| | | | |
|---|---|---|---|
| 2,808,288 A | 10/1957 | Benson | |
| 2,931,644 A * | 4/1960 | Kenworthy | B25H 1/0007 269/17 |
| 3,521,875 A * | 7/1970 | Kapelsohn | B23K 37/0452 269/287 |
| 3,606,033 A * | 9/1971 | Barilla | B23Q 1/527 414/777 |
| 3,868,101 A * | 2/1975 | Nozaki | B23Q 1/527 269/139 |
| 4,202,539 A * | 5/1980 | Polastri | B25H 1/0007 269/287 |
| 4,381,855 A | 5/1983 | Ryan | |
| 4,491,307 A * | 1/1985 | Ellefson | B23K 37/0452 269/246 |
| 4,533,128 A * | 8/1985 | Guigon | B23K 37/0538 269/287 |
| 4,730,382 A * | 3/1988 | Parsons | B23Q 1/4809 269/7 |
| 4,750,785 A | 6/1988 | Helton | |
| 4,866,828 A | 9/1989 | Fraser | |
| 5,017,081 A | 5/1991 | Helton | |
| 5,158,125 A * | 10/1992 | Edwards | B23Q 1/522 144/137 |
| 5,690,323 A * | 11/1997 | Puttmer | B23B 31/16275 269/20 |
| 5,947,665 A | 9/1999 | Baur et al. | |
| 7,303,365 B2 | 12/2007 | Wobben | |
| 7,581,934 B2 | 9/2009 | Wobben | |
| 7,744,318 B2 | 6/2010 | Wobben | |
| 7,832,987 B2 * | 11/2010 | Haarh | B66C 1/108 416/146 R |
| 7,958,039 B2 | 7/2011 | Wobben | |
| 2005/0031431 A1* | 2/2005 | Wobben | B60P 3/40 410/45 |
| 2011/0031292 A1* | 2/2011 | Krogh | B60P 3/40 224/553 |

FOREIGN PATENT DOCUMENTS

| | | | |
|---|---|---|---|
| DE | 102 11 357 A1 | | 9/2002 |
| EP | 1 101 936 A2 | | 5/2001 |
| JP | 48-87712 U | | 10/1973 |
| JP | 55-1221 U | | 1/1980 |
| JP | 55-171644 U | | 12/1980 |
| JP | 56-17778 A | | 2/1981 |
| JP | 61-119840 U | | 7/1986 |
| JP | 2-113538 U | | 9/1990 |
| JP | 6-920 U | | 1/1994 |
| JP | 2002-59776 A | | 2/2002 |
| JP | 2010-216317 A | | 9/2010 |
| JP | 2010216317 A | * 9/2010 | F03D 1/005 |
| WO | 03/057528 A1 | | 7/2003 |
| WO | 2005071261 A1 | | 8/2005 |
| WO | 2011/098086 A1 | | 8/2011 |

\* cited by examiner

DEVICE FOR HANDLING A WIND TURBINE ROTOR BLADE

BACKGROUND

Technical Field

The invention concerns an apparatus for handling a rotor blade of a wind power installation, in particular for holding the rotor blade and performing rotary and/or translatory movements.

Description of the Related Art

The construction and manufacture of a rotor blade up to definitive mounting thereof at the location of use are effected in a plurality of working and process steps. In the course of those operations the rotor blade has to be repeatedly lifted, turned, displaced and changed in terms of the way it is clamped to make various regions on the rotor blade accessible for the operations to be performed. The above-mentioned working steps become more difficult with increasing dimensions of the rotor blade and are the subject of an ever increasing amount of work and time, which has an adverse effect on the economy of rotor blades to be produced.

Fixedly anchored holders for clamping rotor blades are known from the state of the art. A disadvantage with those holders is that they are provided only for carrying out work along a single treatment position or section and, for carrying out working operations along a further treatment section, the rotor blade has to be undamped, transported away and re-clamped. In addition the known holders are only suitable for clamping and holding relatively small rotor blades. That requires the use of lifting devices and devices for changing the clamping action, which make it possible to perform transport operations. In addition the clamping devices which are fixedly anchored in the ground are not movable so that, after production, the rotor blade has to be freed from the clamping device and is to be conveyed on to a vehicle by means of lifting and re-clamping devices. Thus the manufacture of a rotor blade is linked to working steps which only represent clamping and re-clamping for the purposes of re-positioning of the rotor blade, and do not represent a manufacturing process or working step for the rotor blade. Those operations result in the economy in manufacture of rotor blades being adversely affected.

The following state of the art was searched in the German patent application from which priority is claimed: WO 2003/057 528 A1.

BRIEF SUMMARY

One or more embodiments of the invention are directed to an apparatus for handling a rotor blade for better manufacture, re-positioning, conveyance and mounting of rotor blades.

In one embodiment there is provided an apparatus for handling a rotor blade of a wind power installation. The apparatus has at least one main body for at least partially embracing the rotor blade with a longitudinal axis, at least one contact portion for bearing against the rotor blade and at least one main frame for receiving the main body for rotation of the main body about the longitudinal axis and/or for displacement of the main body. The main body has at least one pivotably mounted pivotal portion for engagement at at least one side of the rotor blade. The pivotal portion can substantially represent a bar which is mounted pivotably to the main body and which can be connected to the rotor blade.

The main body can be of such a design configuration that it receives a rotor blade, in particular a rotor blade of a wind power installation. The rotor blade is completely or at least partially embraced by the main body. The main body at least partially embraces the rotor blade about its longitudinal axis and is substantially of a design configuration for gripping it.

The pivotal portion engages into the rotor blade when letting the rotor blade down or during positioning of the rotor blade. The pivotal portion preferably has a suitably adapted docking region which is adapted for making the connection to a correspondingly provided region on the rotor blade. The docking region is preferably of a pin-like configuration and, by means of a pivotal movement, can be inserted into the rotor blade or the rotor blade can be let down in such a way that the pivotal portion and the docking region are beneath the region provided for same on the rotor blade and are introduced into the insertion region of the rotor blade. After the docking region of the pivotal portion has been connected to the rotor blade the connection is secured. Securing is to be effected for example by means of a screw connection or a latching engagement element.

In addition the main body can have at least one contact portion for bearing against the rotor blade within the main body. The contact portion can have a contact surface comprising an elastic material in order not to damage the surface of the rotor blade when bearing thereagainst. The contact portion can be within the main body and/or has auxiliary arms which are admittedly fixed to the main body but at the ends thereof have contact portions which permit them to bear against the rotor blade. The contact portion can be such that the position of the contact portion is suitably adapted to the position of the rotor blade and the rotor blade can be supported on the contact portion. For that purpose the auxiliary arms can be movable and can come into latching engagement when a desired position is reached and can thus support or carry the rotor blade. In addition the contact portion can be moved away from the blade to permit access to the complete blade surface. The main body is mounted on the main frame rotatably and/or displaceably. To perform a rotary movement the main body can have a substantially smooth outside surface which, with a rolling bearing on the main frame, permits a rotary movement. In that case the rotary movement can be transmitted by way of the rolling bearing in frictionally locking relationship and/or in positively locking relationship, for example by way of chains or gears. In addition the main body can be mounted on at least one further device on the main frame, which permits a movement relative to the main frame. In that respect both movements transversely to and also longitudinally relative to the main frame are meant.

In a further preferred embodiment the main body is of a C-shaped configuration. The rotor blade is received in a particularly advantageous fashion by the C-shaping of the main body, that represents a circle that is not closed, as on the one hand this provides a gripping shape while on the other hand it affords a circular external shape for performing rotary movements on the main frame. In addition the fact of the main body being of a C-shaped configuration enhances the stability and strength of the main body.

In a preferred embodiment of the invention the main frame has at least one rolling bearing for rotatably mounting the main body. Various rolling bearings can be used for that purpose for rotatably mounting the main body. The main body has rolling surfaces of differing sizes which are to be supported with rolling bearings at the main frame side. It is therefore possible to arrange on the main frame various rolling bearings which with the corresponding rolling surfaces on the main body permit a rotary movement of the main body on the main frame.

In a preferred embodiment of the invention the main frame has at least one support means for carrying the main frame and/or wheels for displacement of the apparatus on a ground surface or on a rail system. The support means on the main frame are used to carry the main frame and support the main frame on a ground or floor surface. The main frame can have wheels which permit a translatory movement of the apparatus on the floor surface or on a rail system. Preferably the main frame can have both support means and also wheels for performing translatory movements, wherein, when a given position of the apparatus is reached, the support means can be extended and thus the apparatus is securely positioned and further movement is prevented. That can be implemented for example in the form of a swap body system. The possibility of performing translatory movements is of significance in particular when transporting the rotor blade along different treatment sections for processing and production of the rotor blade so that the rotor blade does not have to be transloaded on to a further transport means or changed in respect of its clamped condition.

In a further preferred embodiment of the invention the main frame has at least one drive means for displacement of the main body and/or the main frame. In particular rotating electric motors are used as the drive means. They serve on the one hand for performing rotary movements of the main body on the main frame and on the other hand for performing translatory movements of the main frame relative to the environment. In addition the drive means are also used for performing translatory movements of a device on the main frame. In this variant, a device which is displaceable transversely and/or longitudinally is installed on the main frame and the main body is mounted on the device. Accordingly, in spite of the main frame being stationary on the surface of the earth, a translatory movement of the main body is possible by displacement of the device relative to the main frame. In regard to the translatory movements of the device with the main body on the main frame, these are to be viewed substantially as movements along and/or transversely relative to the main frame and thus along and/or transversely relative to the longitudinal axis of the main body and substantially parallel to the surface of the ground. The above-mentioned variant is particularly advantageously used when the main frame is displaced on a rail system and no transverse movement of the main frame can be performed.

In a preferred embodiment of the invention the main body and/or the main frame has at least one carrier region for hangingly engaging for example a hook. That possible option is intended to save on a complicated and expensive operation of changing the clamping of the rotor blade for transport to a further position, treatment section or mounting location, and is intended thus to permit hooking engagement and lifting of the main frame together with the rotor blade.

In a further embodiment of the invention at least one of the contact portions is mounted rotatably on the main body or on an auxiliary arm. The rotatable mounting of the contact portion on the main body or the auxiliary arm enhances the flexibility and adaptability of the contact portion when bearing against the rotor blade so that, depending on the respectively selected position of the rotor blade that is to be brought into contact with the contact portion, the contact portion can assume an appropriate orientation suited to the rotor blade surface. Preferably contact portions which are rotatable and/or which are provided with an auxiliary arm are mounted to the main body. In that case, upon being let down, the rotor blade is firstly brought into contact with the fixedly positioned contact portions, and in a further step the movable contact portions are applied in matching relationship to the suitable rotor blade surfaces.

One embodiment concerns a method of rotating and/or displacing a rotor blade of a wind power installation. The method comprises the following steps: letting down the rotor blade in a main body, applying at least one contact portion to the rotor blade, supporting and fixing the rotor blade with at least one of the contact portions and rotating the rotor blade by means of rotation of the main body about a longitudinal axis of the main body and/or displacing the rotor blade by means of displacement of the main body on a main frame and/or by means of displacement of the main frame relative to the environment. The aforementioned method is used preferably in the production of rotor blades and/or the implementation of individual working steps in the initial formation phase of a rotor blade, in particular a rotor blade of a wind power installation. For that purpose firstly the rotor blade of a wind power installation or the rotor blade, that is not yet finished, of a wind power installation is let down in the main body or a part of the rotor blade to be produced is let down in the main body or moved longitudinally into the main body so that the rotor blade is disposed at least partially within the main body. Then at least one contact portion is applied to the rotor blade and the rotor blade is supported and fixed with at least one of the contact portions. In that situation the contact portions are adapted to be movable in such a way that suitable adaptation can be performed upon being applied to the surface of the rotor blade. For that purpose the contact portions have auxiliary arms which permit a suitable movement for application to the rotor blade in adapted relationship therewith. After the aforementioned steps working operations can be carried out on the rotor blade and the rotor blade can be further processed along a treatment section and can be provided with various structural components and materials. During implementation of the above-mentioned working steps, if required rotation of the rotor blade is to be effected by means of rotation of the main body about a longitudinal axis of the main body and/or displacement of the rotor blade is to be implemented by means of displacement of the main body on a main frame and/or by means of displacement of the main frame relative to the environment. In that case the rotor blade is made accessible for performing working operations from different sides by the rotation or displacement of the main body on the main frame. In addition the main frame can also be moved relative to the environment and thus the rotor blade can be displaced along or transversely relative to the treatment section and positioned. A rotary movement of the main body on the main frame can be effected in both directions and depending on the respective width of the rotor blade or the extent to which it projects from the main body such movement can possibly be restricted and thus it is not possible to perform a complete revolution of the main body and therewith the rotor blade.

In a further embodiment, another method according to the invention includes two additional steps for positioning and fixing the rotor blade. In that method the rotor blade, after being let down in the direction of the main body, is firstly brought into connected relationship with a pivotal portion. In that way the pivotal portion is releasably connected to the rotor blade. In particular a docking region on the pivotal portion can be used for that purpose. That docking region is appropriately adapted to a receiving region on the rotor blade so that mounting the docking region to the region provided for same on the rotor blade is possible. After mounting of the pivotal portion and/or the docking region to the rotor blade the pivotal portion and/or the docking region is releasably fixed to the rotor blade. In this step the docking region can be passed into the rotor blade and project out of the other side thereof in order then to secure it with a suitable fixing means and to connect it to the rotor blade so as to prevent the rotor blade from being taken out or dropping out without releasing the fixing means. The next step after applying at least one contact portion to the rotor blade is to support and fix the rotor blade with at least one of the contact portions, in a comparable fashion to the above-mentioned method. In this case two different positions of the rotor blade relative to the main body can be taken as the basic starting point. The first variant is when the rotor blade, upon applying a pivotal portion, is already disposed partially within the main body, while as a second variant it is possible for the rotor blade to be fitted to the pivotal portion, with the pivotal portion pivoted open, and to be fixed thereto, and then to be moved or pivoted into the main body by the pivotal movement of the pivotal portion in order then subsequently to implement support and fixing of the rotor blade with at least one of the contact portions.

In a further method according to the invention the variant already mentioned hereinbefore, namely when the rotor blade is already disposed partially within the main body, and has been brought into contact with a contact portion, is brought into contact with a pivotal portion. With that method the rotor blade is already disposed partially within the main body so that rotation after fixing to the pivotal portion in the main body is no longer required.

BRIEF DESCRIPTION OF THE SEVERAL VIEWS OF THE DRAWINGS

Further features and advantages of the invention are subject-matter of the description hereinafter and the drawing illustrating an embodiment by way of example.

Identical or functionally equivalent elements are denoted by the same reference in all Figures.

DETAILED DESCRIPTION

Figure 1:
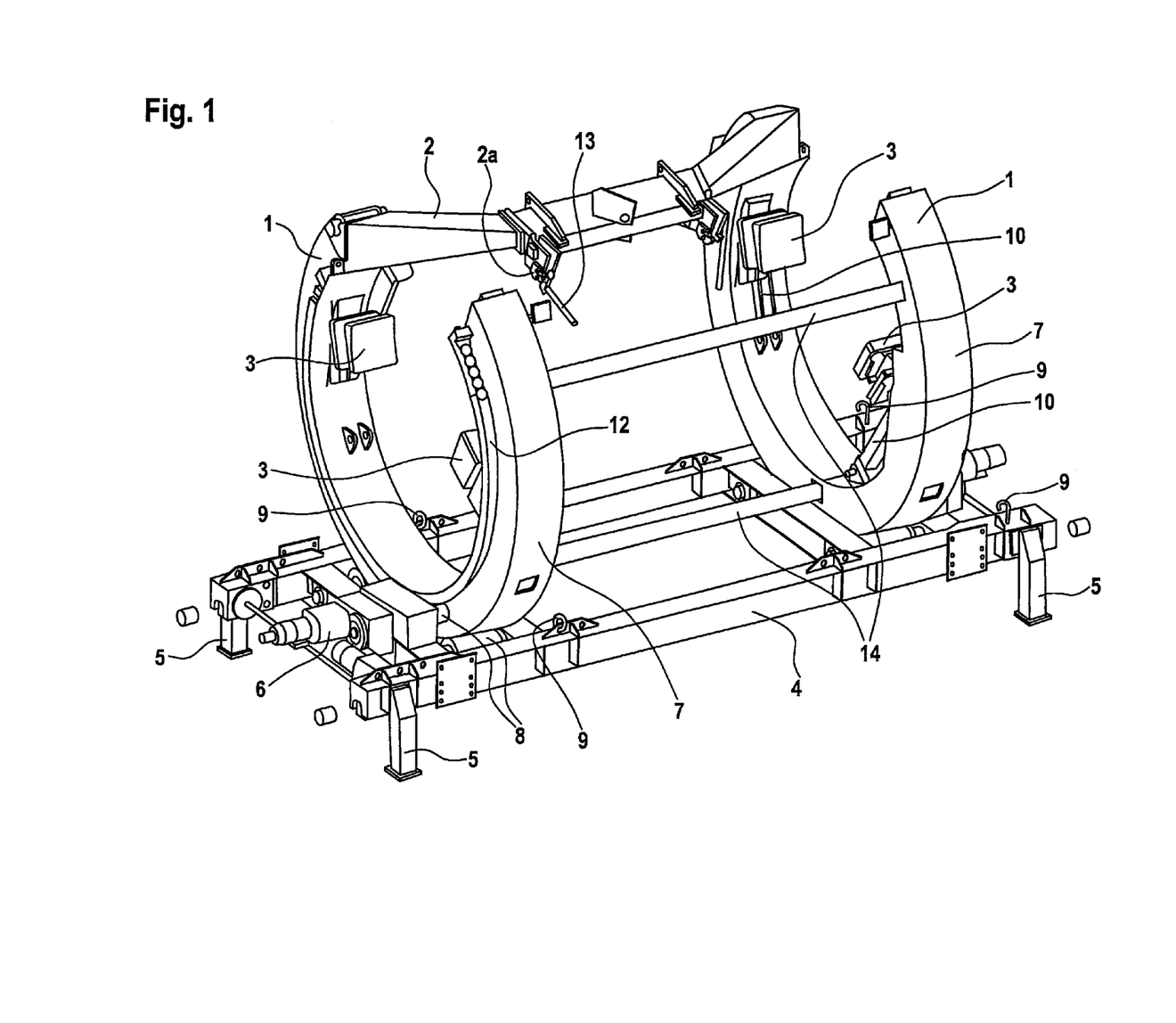
FIG. 1 shows a perspective view of an apparatus for handling a wind power installation rotor blade according to a first embodiment.

FIG. 1 shows a perspective view of an apparatus for handling a wind power installation rotor blade according to a first embodiment. The apparatus has a main body 1 (for example in the form of a rotary ring) with two C-shaped elements connected together by way of transverse bars 14. A pivotal portion or a pivotal bar or yoke 2 can connect first ends of the C-shaped rotary rings together. The main body 1 is mounted on a main frame 4 rotatably for example by means of rolling bearings 8. Provided on the main body 1 are contact portions 3 which partially or optionally have auxiliary arms 10 mounted rotatably or pivotably to the main body 1. The contact portions 3 can be in the form of strap supports and are provided for bearing against a rotor blade which is let down or introduced into the main body 1. The main body 1 has first large rolling surfaces 7 and second small rolling surfaces 12. The first and second rolling surfaces 7 and 12 form a connection with the rolling bearings 8 arranged on the main frame 4 for rotation of the main body 1 on the main frame 4. The second rolling surfaces 12 form a connection with the rolling bearings 8 which are operated by way of drive means 6, such as the electric motors mentioned above, and can be driven by way of the drive means 6 to perform a rotary movement of the main body 1. The drive means 6 is mounted on the main frame 4 and the main frame 4 can be set up on a ground surface by way of support structure or means 5. As an alternative thereto it is also possible to provide swap bodies. For carrying, lifting and transporting purposes the main frame 4 has carrier regions 9 which can be connected to corresponding hooks and can be lifted for example by means of a crane.

The pivotal portion or the pivotal yoke 2 can accommodate a bolt or pin 13 mounted in the rotor blade in order thereby to fix the rotor blade to the pivotal arm 2. Fixing of the bolt 13 to the pivotal arm can be effected for example by a rotatably mounted disc, in which case the bolt 13 is automatically locked by the rotary movement of the disc. The disc can for example also be in the form of a locking pawl.

Figure 2:
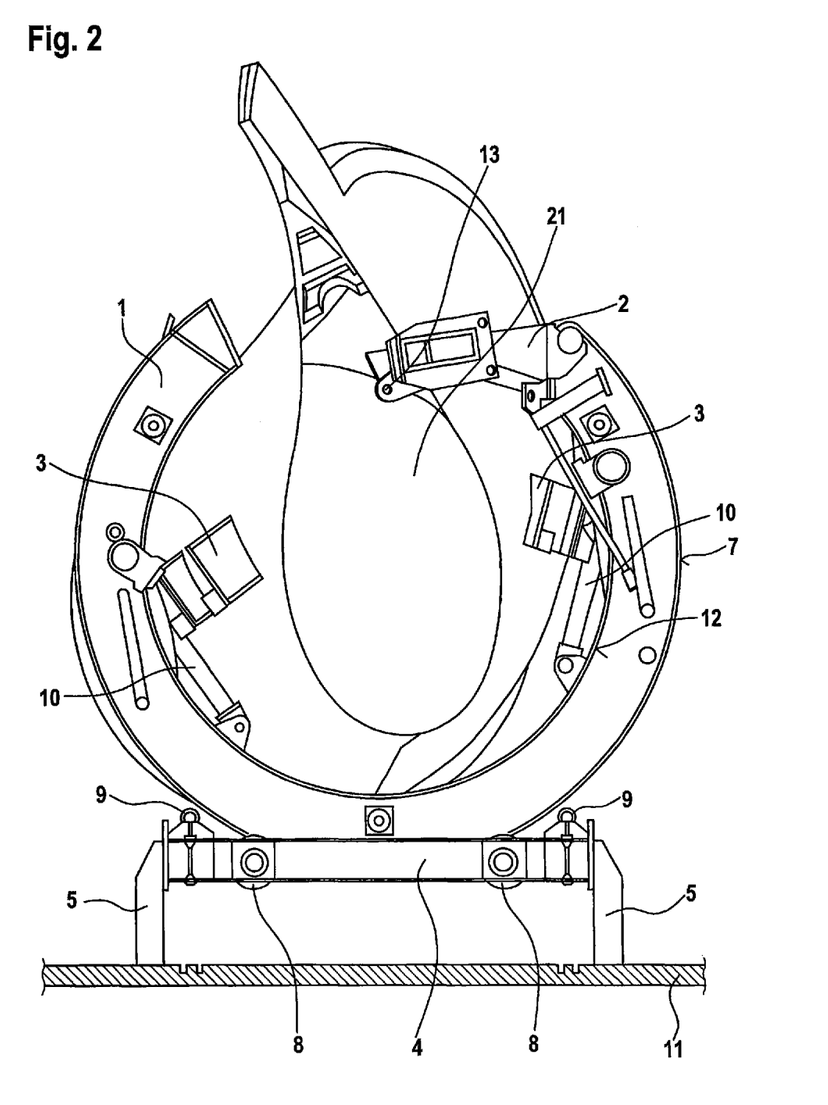
FIG. 2 shows a cross-section of the FIG. 1 apparatus.

FIG. 2 shows a cross-section through the FIG. 1 apparatus. A rotor blade 21 is additionally disposed within the main body 1. The rotor blade 21 is connected to a pivotal portion 2, in this case a docking region 13 on the pivotal portion 2 is brought into engagement with a region provided for that purpose on the rotor blade 21 so that the rotor blade 21 hangs on the pivotal portion 2. In FIG. 2 the rotor blade is not yet connected to one of the contact portions 3. The main body 1 together with the rotor blade 21 is mounted rotatably on the main frame 4 and the main frame 4 is placed by way of support means 5 on a ground or floor surface 11.

Figure 3A:
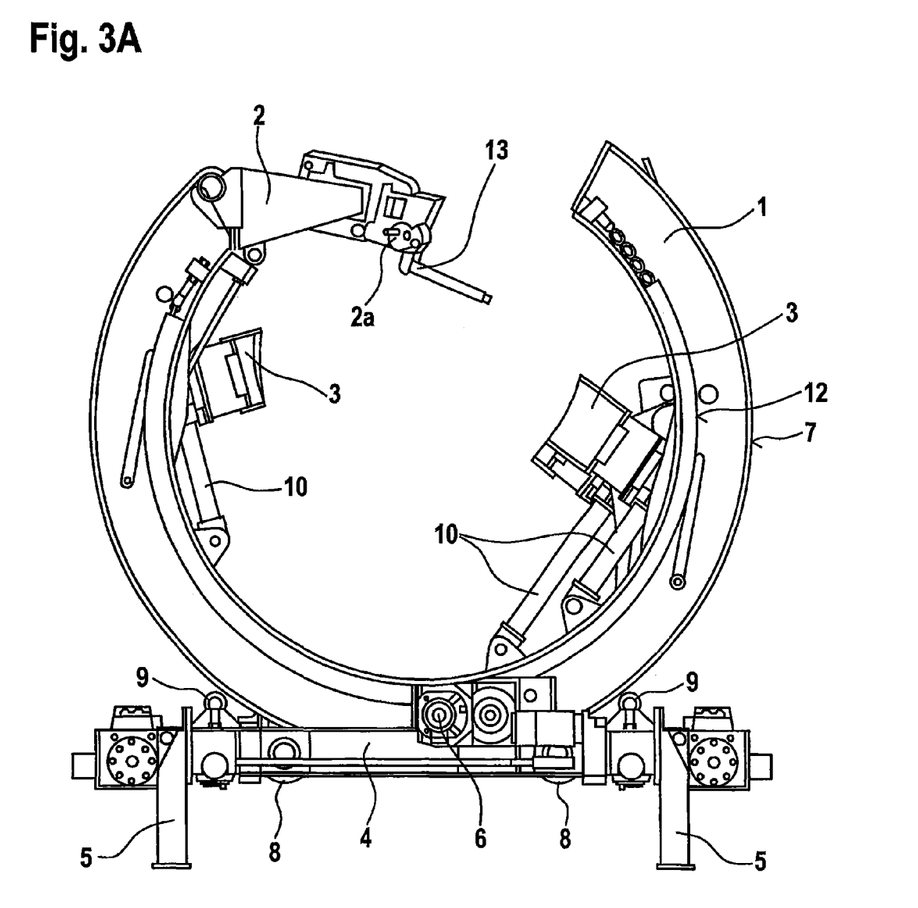
FIG. 3A shows a front view of the FIG. 1 apparatus.

FIG. 3A shows a front view of the FIG. 1 apparatus. Here in particular a bolt 13 on the pivotal portion 2 can be clearly seen. The bolt 13 is mounted in a rotor blade and can be fixed to the pivotal portion 2 by means of a locking pawl 2a. The locking pawl is in the form of a rotatably mounted disc, wherein rotary movement of the disc automatically leads to locking of the bolt in the locking pawl. That makes it possible to implement locking in any desired longitudinal rotary position of the rotor blade. The locked rotary position can be unlocked again by means of a counteracting force, like for example a spring.

Figure 3B:
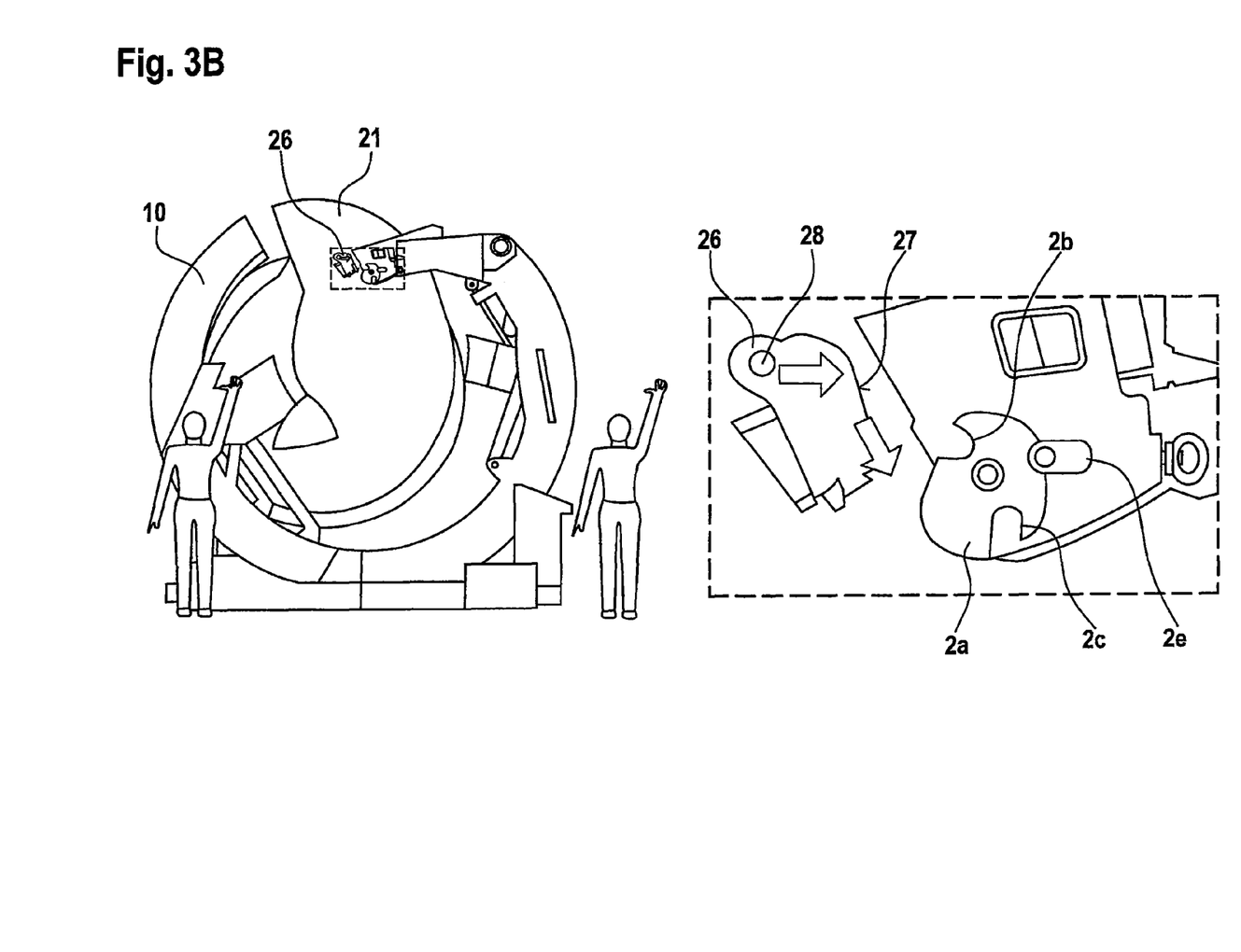
FIG. 3B shows a diagrammatic view of the apparatus for handling a rotor blade according to a first embodiment.

FIG. 3B shows a diagrammatic view of the apparatus for handling a rotor blade in accordance with a first embodiment. A rotor blade lifting eye 26 can be fixed to the rotor blade 21 for example by means of the bolt 13. The rotor blade lifting eye 26 has an abutment surface 27 and two projections 28. The rotor blade lifting eye 26 is fixed in the locking pawl 2a by means of the abutment surface 27 and the projections 28. For that purpose the locking pawl 2a has a first recess 2b and a second recess 2c as well as a locking pin 2e. In a locking position of the locking pawl 2a the projections 28 are disposed in the recess 2a and the pin 2e is locked in the recess 2c.

Figure 4:
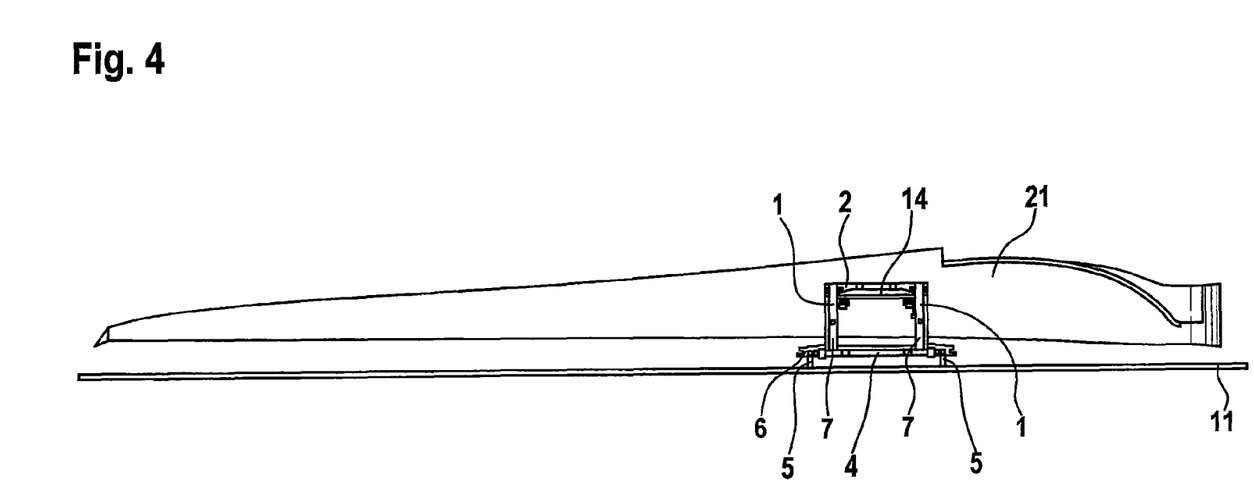
FIG. 4 shows a side view of the FIG. 1 apparatus together with a rotor blade.

FIG. 4 shows a further side view of the apparatus according to the invention in the first embodiment, and a rotor blade. A rotor blade 21 is placed in the main body 1 and is mounted rotatably on the main frame 4 by the main body 1.

Figure 5:
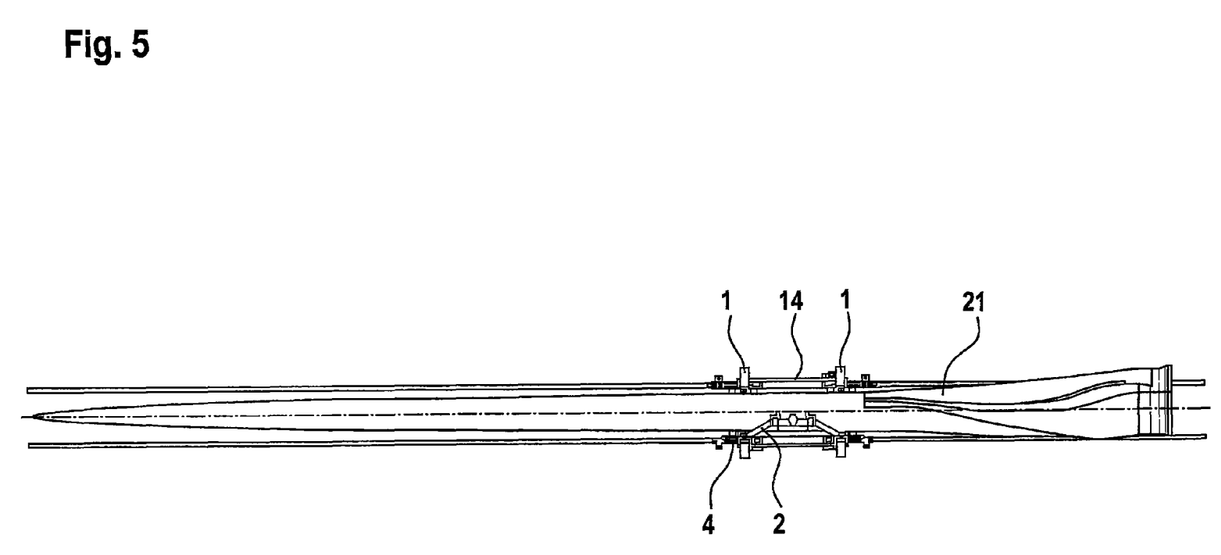
FIG. 5 shows a plan view of the FIG. 1 apparatus according to the first embodiment together with a rotor blade.

FIG. 5 shows a plan view of the FIG. 1 apparatus in accordance with the first embodiment together with a rotor blade. The rotor blade 21 is placed in the main body 1 and the main frame 4 carries the main body 1. FIG. 5 shows docking of the pivotal portion 2 to the rotor blade 21 and shows that the rotor blade 21 is not completely embraced by the main body 1 or pivotal portion 2. In addition the rotor blade has been turned through 90° in comparison with FIG. 4.

The contact portion 3 can have a contact surface comprising an elastic material in order not to damage the surface of the rotor blade when bearing against it. The contact portion 3 can be provided on the main body and/or has auxiliary arms which are admittedly fixed to the main body but which at their ends have contact portions which make it possible for them to bear against the rotor blade. The contact portion 3 can be of such a configuration that the position of the contact portion is adapted to correspond to the position of the rotor blade and the rotor blade can be supported on the contact portion. For that purpose the auxiliary arms can be movable and, when a desired position is reached, can come into latching engagement and thus support or carry the rotor blade.

The main body 1 is mounted on the main frame rotatably and/or displaceably in the longitudinal direction. To perform a rotary movement the main body can have a substantially smooth outside surface which permits a rotary movement with a rolling bearing on the main frame. In addition the main body can be mounted on at least one further device on the main frame, which permits a movement relative to the main frame. In that respect both movements transversely and also longitudinally relative to the main frame can be possible.

The pivotal portion can substantially represent a bar or yoke which is mounted pivotably to the main body and which can be connected to the rotor blade. The pivotal portion can engage into the rotor blade when the rotor blade is let down or during positioning of the rotor blade. The pivotal portion preferably has an adapted docking region which is adapted to make a connection with a correspondingly provided region on the rotor blade. The docking region is preferably of a pin-like configuration and can be fitted into the rotor blade by means of a pivotal movement or the rotor blade can be let down in such a way that the pivotal portion and the docking region are disposed beneath the region provided for same on the rotor blade and are introduced into the insertion region of the rotor blade. After the connection of the docking region of the pivotal portion to the rotor blade is made the connection is secured. Securing is to be effected for example by means of a screw connection or a latching element.

The fact of the rotor blade being received by the C-shaped rotary ring which represents a circle that is not closed is particularly advantageous as on the one hand this involves a gripping shape and on the other hand a circular external shape for performing rotary movements on the main frame. The configuration of the main body in a C-shape also enhances stability and strength of the main body.

The support means on the main frame are used to carry the main frame and support the main frame on a ground surface. The main frame has wheels which permit a translatory movement of the apparatus on the ground surface or on a rail system. Preferably the main frame can have both support means and also wheels for performing translatory movements, wherein, when a given position of the apparatus is reached, the support means can be extended and thus the apparatus is securely positioned and further movement is prevented. The possibility of performing translatory movements is advantageous in particular when transporting the rotor blade along different treatment sections for processing and production of the rotor blade so that the rotor blade does not have to be transloaded on to a further transport means or changed in respect of its clamped condition.

In particular rotary electric motors are used as the drive means. They serve on the one hand to perform rotary movements of the main body on the main frame and on the other hand to perform translatory movements of the main frame relative to the environment. In addition the drive means are also used for performing translatory movements of a device on the main frame. In this variant, a device which is displaceable transversely and/or longitudinally is installed on the main frame and the main body is mounted on the device. In that way, in spite of the main frame being stationary on the surface of the earth, a translatory movement of the main body is possible by displacement of the device relative to the main frame. In the case of the translatory movements of the device with the main body on the main frame, this is intended to mean essentially movements along and/or transversely relative to the main frame and thus along and/or transversely relative to the longitudinal axis of the main body and substantially parallel to the ground surface. The above-mentioned variant is used to particular advantage when the main frame is displaced on a rail system and no transverse movement of the main frame can be performed.

The rotatable mounting of the contact portion to the main body or the auxiliary arm enhances the flexibility and adaptability of the contact portion when bearing against the rotor blade so that, depending on the selected location on the rotor blade which is to be brought into contact with the contact portion, the contact portion can assume an appropriate orientation suited to the rotor blade surface. Preferably contact portions which are rotatable and/or which are provided with an auxiliary arm are mounted to the main body. In that case, when the rotor blade is let down, it first comes into contact with the fixedly positioned contact portions and in a further step the movable contact portions are applied to the appropriate rotor blade surfaces in adapted relationship therewith.

The apparatus for handling a wind power installation rotor blade according to the second embodiment substantially corresponds in its basic configuration to the apparatus for handling a wind power installation rotor blade according to the first embodiment. The apparatus for handling a rotor blade has a main body 1 mounted rotatably on a main frame 4. The main body 1 can be of a C-shaped and annular configuration. Thus the main body 1 can be for example in the form of a rotary ring. The C-shaped configuration is advantageous because in that way the rotor blade can be introduced into the main body and then fixed. After the rotor blade has been fixed it can be suitably handled by the handling apparatus.

Figure 6:
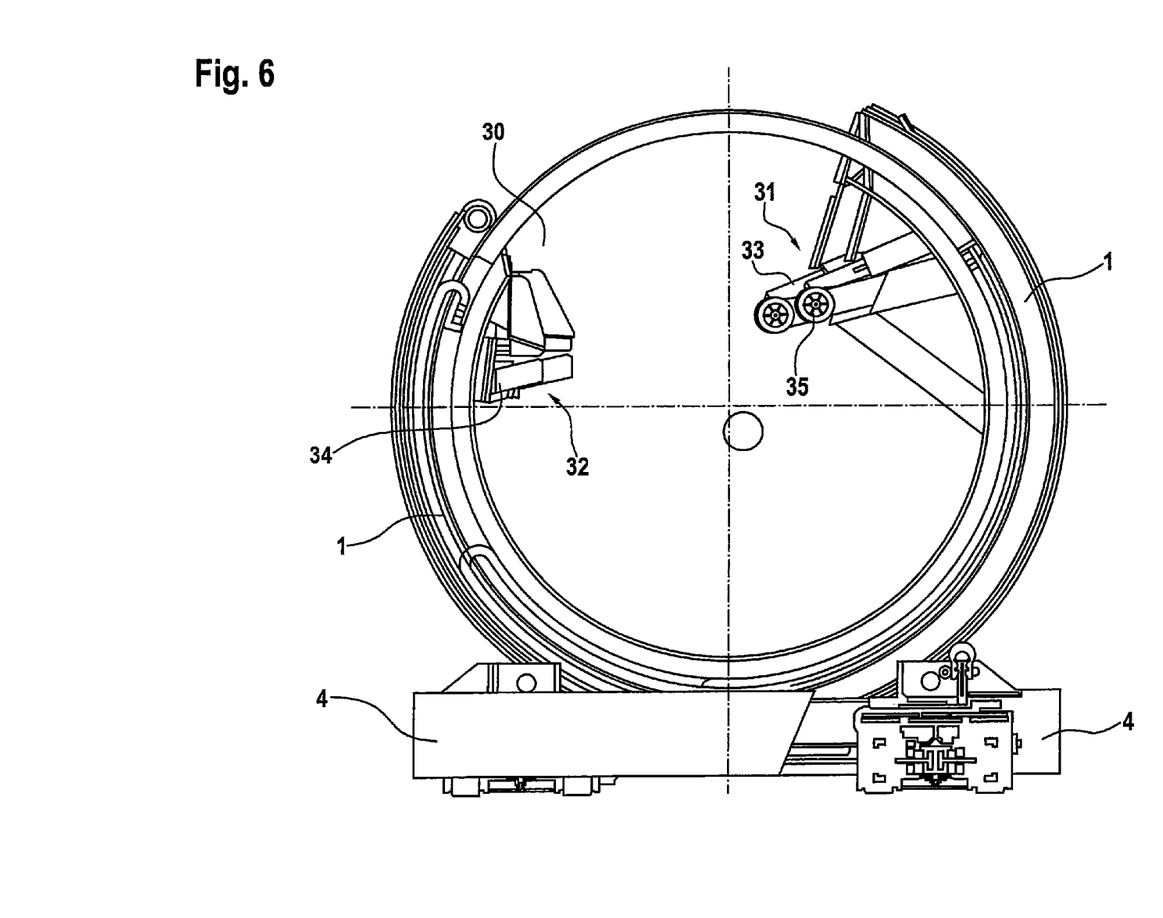
FIG. 6 shows a front view of an apparatus for handling a wind power installation rotor blade according to a second embodiment.

FIG. 6 shows a front view of an apparatus for handling a wind power installation rotor blade according to a second embodiment. The handling apparatus for handling a wind power installation rotor blade in accordance with the second embodiment has a main frame and a for example C-shaped main body 1 mounted rotatably on the main frame 4. In the second embodiment, there is a fixing unit 30 on the main body 1. The fixing unit 30 can have a first portion 31 and a second portion 32, wherein the first portion 31 is provided at a first end of the main body or the C-shaped rotary ring and the second portion 32 is provided at a second end. A rotor blade of a wind power installation can be fixed to the main body 1 by means of the fixing unit 30.

Load or locking pins 33 and rotatable wheels 35 are provided on the first portion 31. The load pins 33 can be prestressed by way of a spring 36. A load or locking pin 34 can be provided on the second portion 32 and can also be prestressed by a spring 37. By virtue of the configuration of the springs 36 and 37 the load pins 33 and/or 34 are constantly pressed against the surface of the rotor blade when it is introduced. Thus the rotor blade can be introduced into the apparatus in a lowering process. That can be effected although the cross-section of the rotor blade at the level of the insertion pins in the blade (pin 25, FIG. 9), at a relatively short horizontal spacing, represents an undercut configuration in relation to the larger spacing of the previous cross-section.

The locking pins 33, 34, as described above, can be prestressed by a spring. As an alternative thereto they can also be actuated by a drive in such a way that they bear in contacting arrangement above the insertion pins (pins 25 in FIG. 9) and thus lock the pins 25. That has the advantage that this permits locking of the rotor blade within the handling apparatus.

Figure 7:
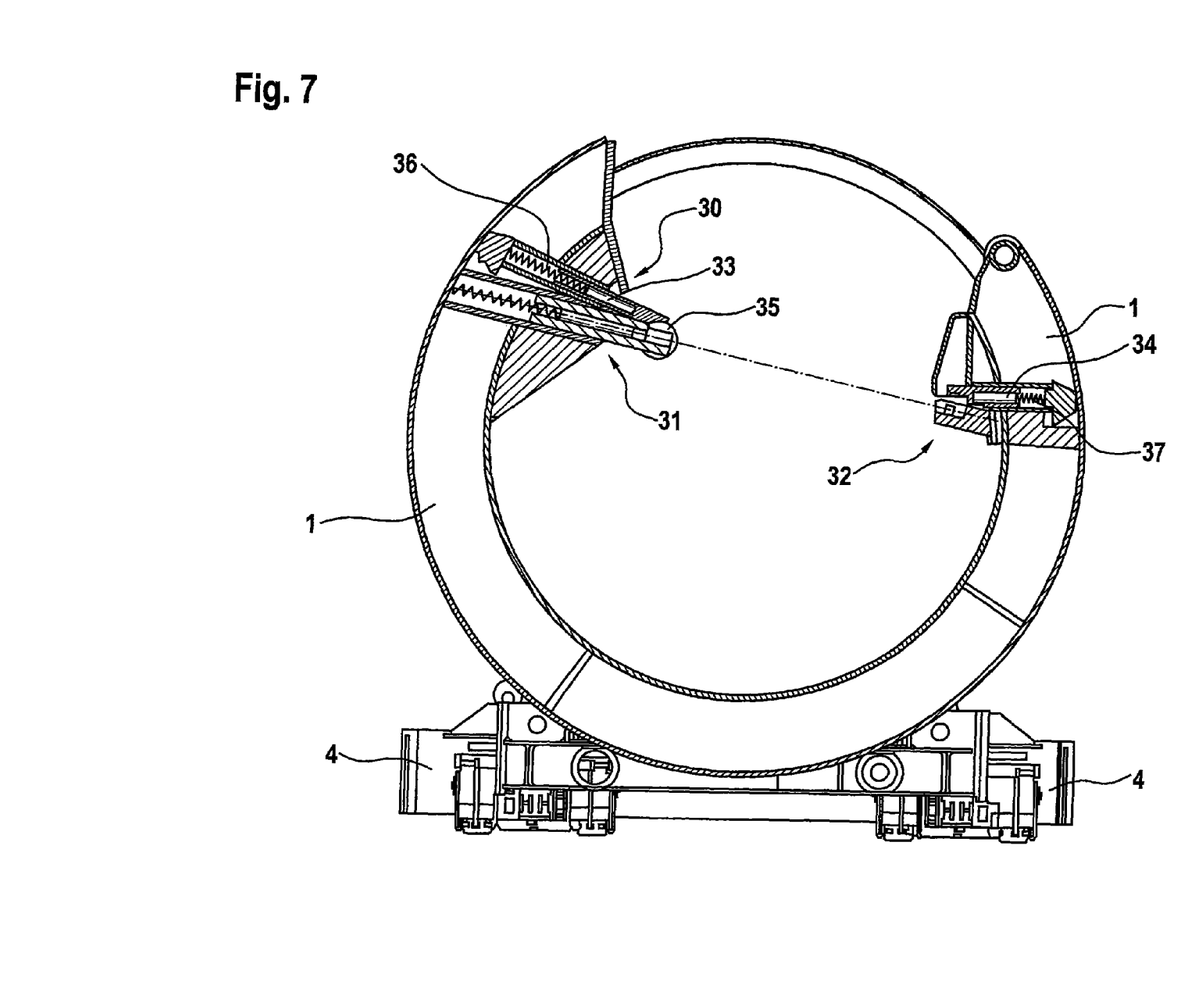
FIG. 7 shows a cross-section of the FIG. 6 apparatus.

FIG. 7 shows a cross-section through the FIG. 6 apparatus. The handling apparatus of the second embodiment has a main frame 4, a main body 1 mounted rotatably thereon for receiving the rotor blade, and a fixing device 30. The fixing device 30 has first and second portions 31, 32. The first portion 31 of the fixing unit 30 has a load or locking pin 33, rotatable wheels 35 and a spring 36 for example for prestressing the pin 33. The second portion 32 also has a pin 34 and a spring 37 for prestressing the pin. The rotor blade can be locked in the handling apparatus by those load pins 33, 34.

Figure 8:
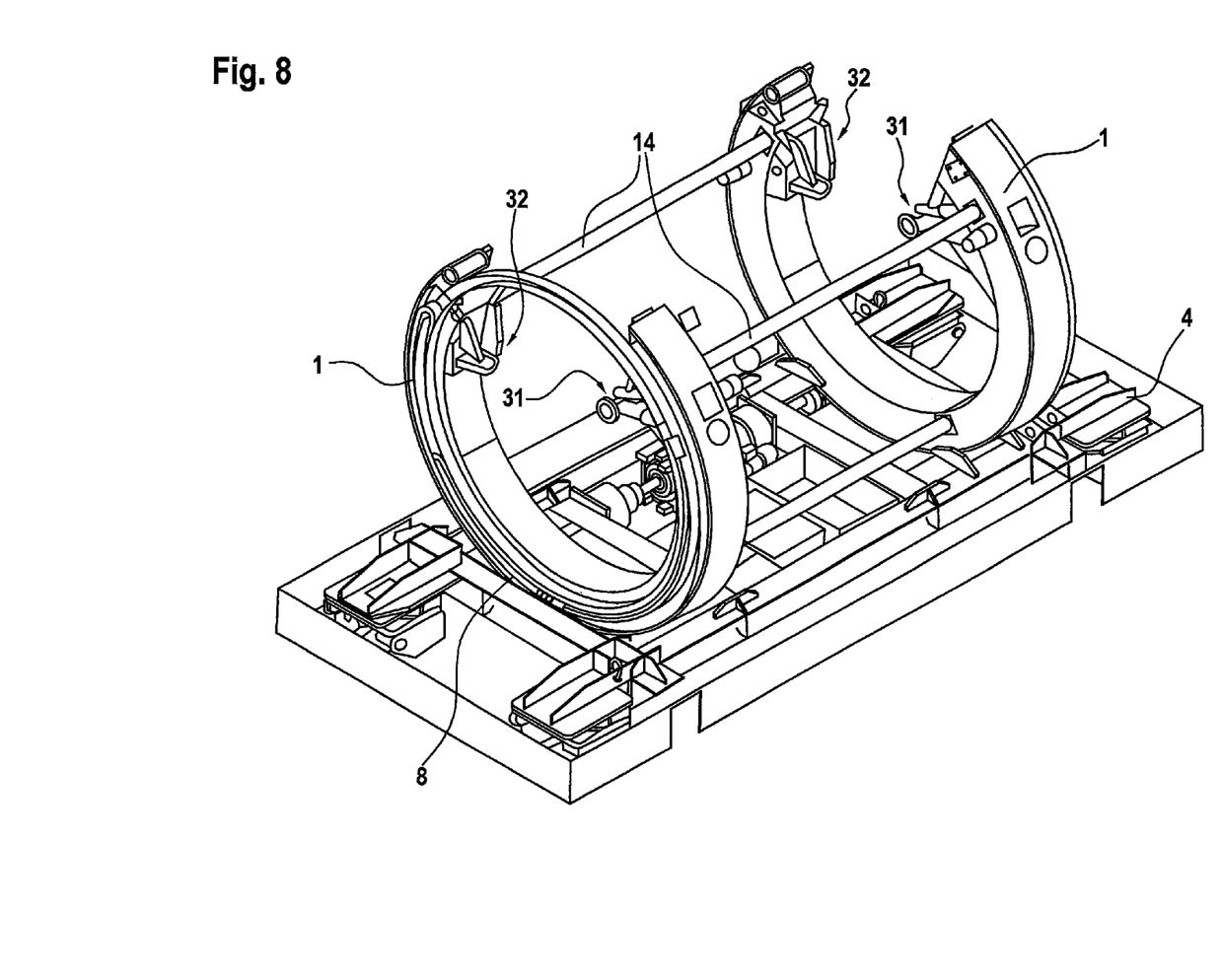
FIG. 8 shows a perspective view of the apparatus for handling a wind power installation rotor blade according to the second embodiment.

FIG. 8 shows a perspective view of the apparatus for handling a wind power installation rotor blade according to the second embodiment. The handling apparatus has a main frame 4 and a main body 1 mounted rotatably thereon. The main body 1 comprises for example two C-shaped and annular rotary rings having an opening, through which a rotor blade of a wind power installation can be introduced. A respective fixing unit with first and second fixing portions 31, 32 is provided on each of the C-shaped rotary rings.

Figure 9:
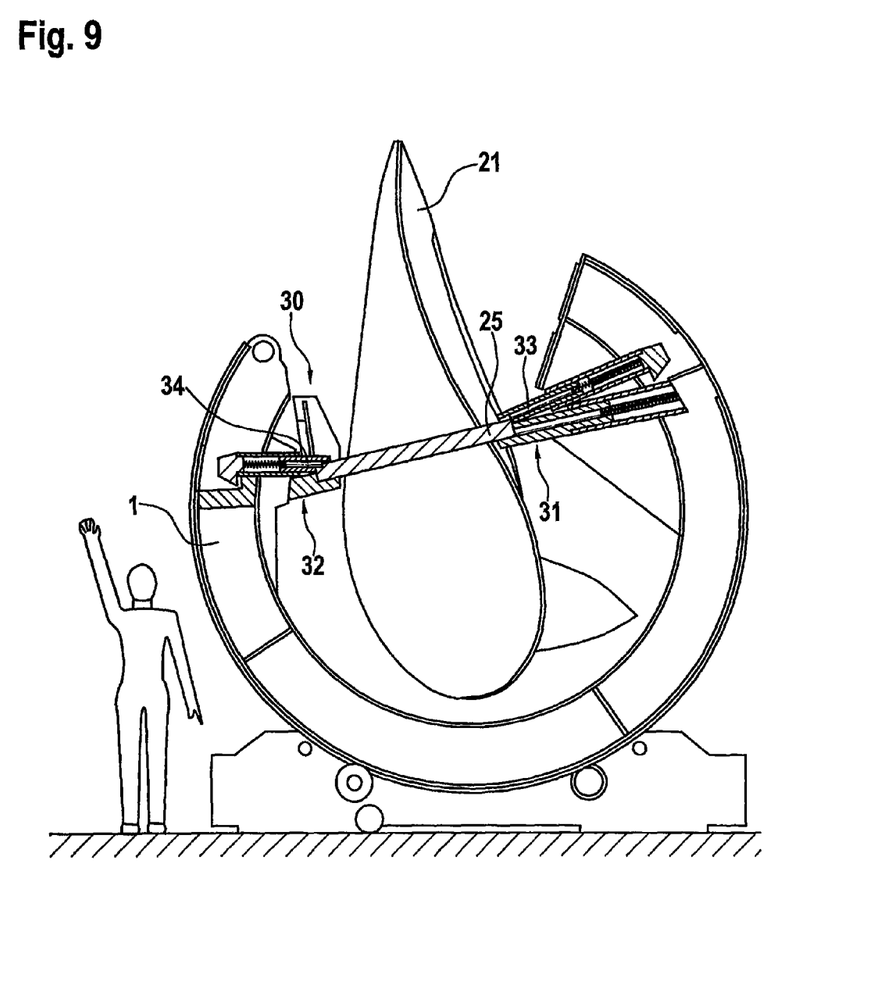
FIG. 9 shows a diagrammatic cross-section of an apparatus for handling a wind power installation rotor blade according to the second embodiment.

FIG. 9 shows a diagrammatic cross-section through an apparatus for handling a wind power installation rotor blade according to the second embodiment. The handling apparatus of the second embodiment has a main frame 4 and a main body 1 mounted rotatably thereon for receiving and fixing a rotor blade of a wind power installation. In the second embodiment the rotor blade 21 of the wind power installation has at least one fixing strut or fixing pin or insertion pin 25 which extends between a pressure side and a suction side of the wind power installation rotor blade and beyond each thereof. Preferably there are two or more insertion pins (fixing struts or fixing pins). The rotor blade 21 can be mounted or fixed in the fixing unit 30 by means of that strut/pin 25. In that situation an end of the strut 25 is provided or fitted in the first portion 31 of the fixing unit and a second end of the strut is provided or mounted in the second portion 32 of the fixing unit 30.

Figure 10:
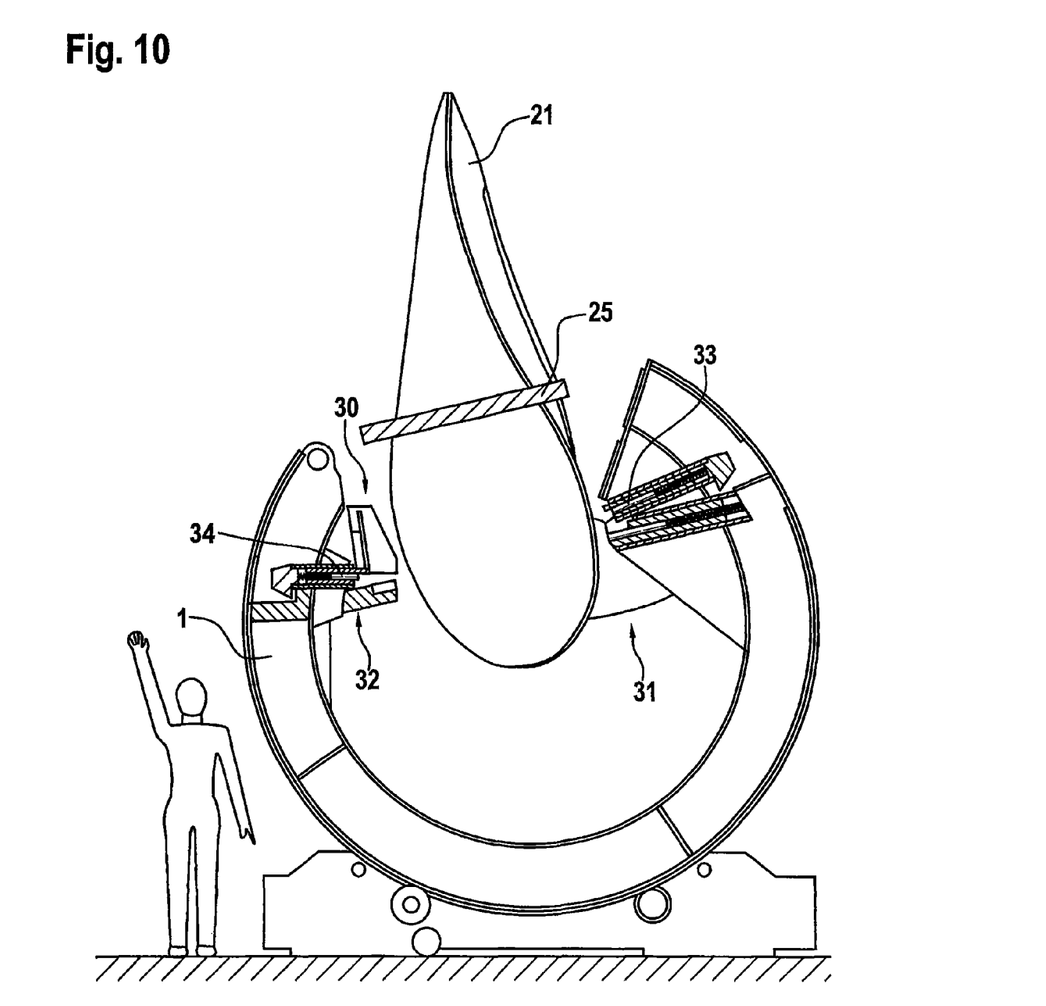
FIG. 10 shows a diagrammatic cross-section of an apparatus for handling a wind power installation rotor blade according to the second embodiment.

FIG. 10 shows a diagrammatic cross-section of an apparatus for handling a wind power installation rotor blade according to the second embodiment. FIG. 9 shows a situation where the rotor blade 21 is just being introduced into the handling apparatus. The handling apparatus of FIG. 10 corresponds to that shown in FIG. 9. As shown in FIG. 10 the pins 33 and 34 are retracted so that the rotor blade can be introduced. It will also be seen from FIG. 10 that the position of the pin 25 in the rotor blade 21 is not provided at the thickest location of the rotor blade.

Figure 11:
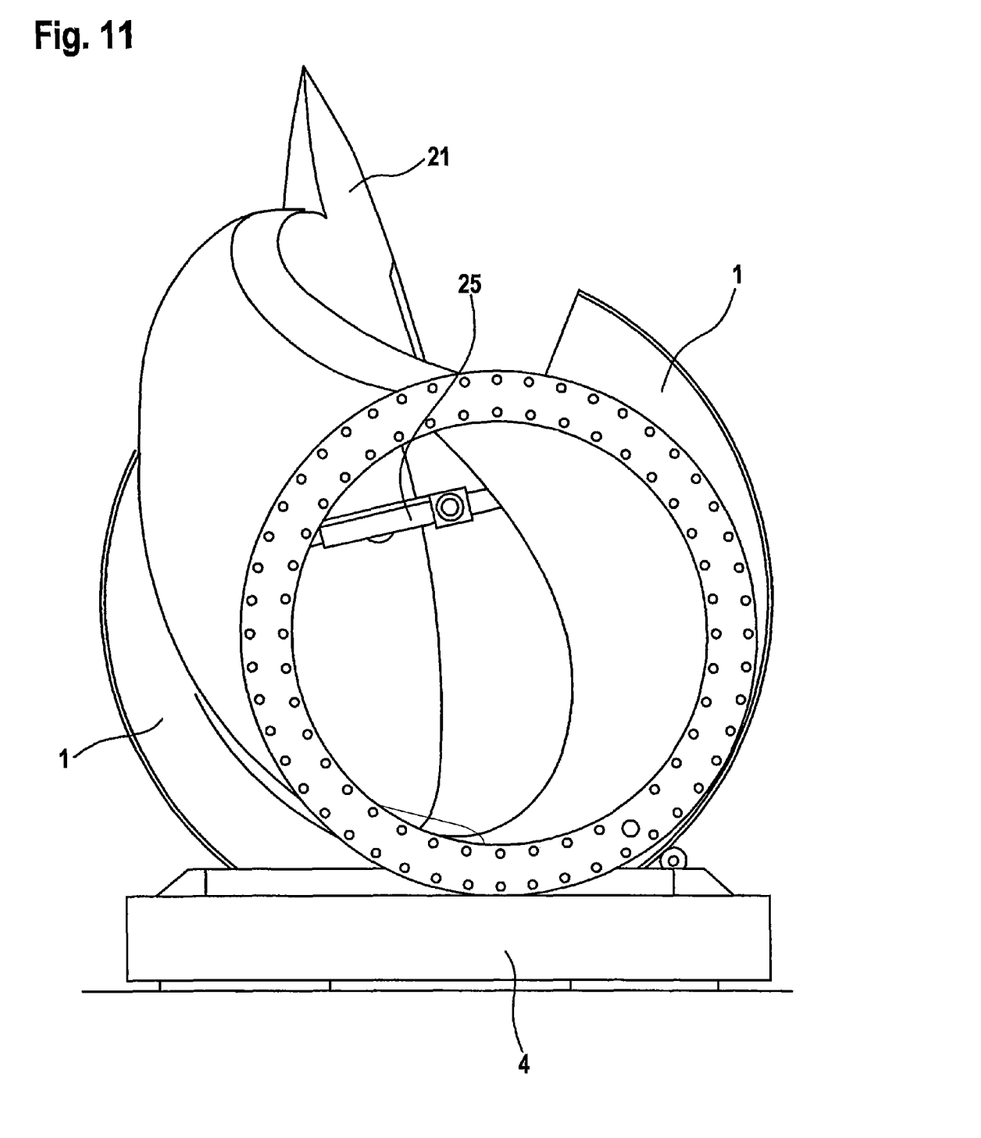
FIG. 11 shows a diagrammatic side view of an apparatus for handling a wind power installation rotor blade according to the second embodiment together with a rotor blade.

FIG. 11 shows a diagrammatic side view of the apparatus for handling a rotor blade in accordance with the second embodiment together with a rotor blade. FIG. 11 shows both the handling apparatus in accordance with the second embodiment and also a rotor blade 21 disposed therein. The Figure also shows the fixing strut 25 within the rotor blade. In that respect the function of the fixing strut corresponds to that shown in FIG. 9.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for handling a wind power installation rotor blade with a longitudinal axis, the apparatus comprising:
   at least one main body for at least partially holding the rotor blade, the at least one main body having at least one pivotably mounted pivotal portion for engagement with at least one side of the rotor blade;
   at least one main frame for rotatably receiving the at least one main body; and
   at least one fixing unit for fixing to a wind power installation rotor blade that is located in the apparatus, the at least one fixing unit having a first portion and a second portion, wherein the first portion is provided at a first end of the at least one main body and the second portion is provided at a second end of the at least one main body, and wherein the at least one fixing unit is adapted to receive a fixing bolt on or in the wind power installation rotor blade, wherein the first and second portions, respectively, have a locking pin for locking the fixing bolt when the wind power installation rotor blade is introduced into the apparatus.

2. The apparatus according to claim 1 wherein the at least one main body is of a C-shaped configuration.

3. The apparatus according to claim 2 wherein the at least one main frame has at least two rolling bearings for rotatably receiving the at least one main body.

4. The apparatus according to claim 1 wherein the at least one main frame has a support means for carrying the main frame and wheels for displacement of the apparatus on a ground surface or on a rail system.

5. The apparatus according to claim 1 wherein the at least one main frame has at least one drive means for rotating the at least one main body for at least one of longitudinal and transverse displacement of the at least one main body.

6. The apparatus according to claim 1 wherein at least one of the at least one main body and the at least one main frame has a carrier region for hangingly engaging a hook.

7. An apparatus for handling a wind power installation rotor blade with a longitudinal axis, the apparatus comprising:
at least one main body for at least partially holding the rotor blade, the at least one main body having at least one pivotably mounted pivotal portion for engagement with at least one side of the rotor blade, wherein the at least one pivotal portion has a locking pawl comprising a first recess, a second recess and a locking pin for locking a rotor blade fixing unit, wherein the rotor blade fixing unit comprises a first projection and a second projection for engaging with the first recess, the locking pin engaging with the second recess for locking; and
at least one main frame for rotatably receiving the at least one main body.

8. A system for handling a wind power installation rotor blade, the system comprising:
a wind power installation rotor blade comprising:
a longitudinal direction;
a suction side and a pressure side; and
a fixing bolt that extends between the suction side and the pressure side and projects beyond the suction side and the pressure side; and
an apparatus comprising:
at least one main body for at least partially holding the wind power installation rotor blade, the at least one main body having at least one pivotably mounted pivotal portion for engagement with at least one side of the wind power installation rotor blade;
at least one main frame for rotatably receiving the at least one main body; and
at least one fixing unit located on the apparatus for fixing to the wind power installation rotor blade, the at least one fixing unit having a first portion and a second portion, wherein the first portion is provided at a first end of the at least one main body and the second portion is provided at a second end of the at least one main body, and wherein the at least one fixing unit is adapted to receiving the fixing bolt of the wind power installation rotor blade, wherein the first and the second portions, respectively, have a locking pin for locking the fixing bolt when the wind power installation rotor blade is introduced into the apparatus.

* * * * *